United States Patent [19]
Brodrick, Sr.

[11] Patent Number: 5,167,321
[45] Date of Patent: Dec. 1, 1992

[54] HOOK AND LOOP CONVEYER SYSTEM

[76] Inventor: Louis T. Brodrick, Sr., 200 Wynn St., Hot Springs, Ark. 71913

[21] Appl. No.: 822,690

[22] Filed: Jan. 21, 1992

[51] Int. Cl.5 .............................................. B65G 37/00
[52] U.S. Cl. ........................... 198/803.01; 198/699.1; 104/73; 472/117
[58] Field of Search ............ 198/699.1, 803.01, 465.1; 104/69, 70, 73; 472/116, 117, 128, 129, 134

[56] References Cited

U.S. PATENT DOCUMENTS

| 724,040 | 3/1903 | Pusterla | 104/73 |
|---|---|---|---|
| 3,253,692 | 5/1966 | Ota | 198/699.1 |
| 3,658,170 | 4/1972 | Wilson | 198/803.01 |
| 4,543,886 | 10/1985 | Spieldiener | 104/73 |
| 4,836,521 | 6/1989 | Barber | 472/117 |
| 5,033,392 | 7/1991 | Schemitsch | 104/73 |

FOREIGN PATENT DOCUMENTS 2689 of 1907 United Kingdom ................. 104/69

Primary Examiner—Joseph E. Valenza

[57] ABSTRACT

Conveying system for transportable objects, especially inflatable, semi-rigid, and rigid rafts, using hook and loop materials to releasably secure the transported objects to conveyors during transport.

5 Claims, 6 Drawing Sheets

5,167,321

HOOK AND LOOP CONVEYER SYSTEM

BACKGROUND OF THE INVENTION

1. Field of the Invention

This invention refers to the transport of objects, especially inflatable, semi-rigid, and rigid rafts on conveyers, using hook and loop materials affixed to the objects and to the conveyer, to releasably secure the objects to the conveyer while being transported by it, the objects being released at the end of the transport, and the cycle repeated.

2. Background

In certain types of water rides used in amusement parks, water parks, etc., rafts are passed through flumes, carrying passengers, and the rafts returned to the top of the flume for repeating the cycle. The rafts may be of different materials, and of different shapes, sizes, and capacities. They may be inflatable, semi-rigid, or rigid. A persistent problem has been finding satisfactory solutions to the return transport of the rafts, especially in the case of steep inclinations. Problems will vary from case to case, and almost all rides are custom built and adapted, e.g. to local conditions of terrain, space availability, a.o., in addition to the type of rafts used. Current methods of securing the rafts to conveyers involve the use of fasteners of different types such as hooks, pegs, etc., fixed to the conveying element: belt, chain, or other, plus a latching part, holes, rings, or other recesses in or on the rafts. These systems require very accurate guidance of the rafts and also present a certain security risk to personnel, since the fasteners can get caught in clothing, etc. They are often relatively labor intensive.

The present invention uses hook and loop materials to achieve temporary, releasable adhesion between the rafts and the conveyer belt or chain. This solution eliminates several of the previous problems. It makes it possible to transport rafts on very steep conveyers, which has hitherto not been feasible. It reduces safety risks in that there are no protruding parts. It greatly facilitates operation, since the rafts do not have to be precisely positioned to match up latching elements. Because of this feature, it is easy to obtain automatic operation at both ends of the conveyer, with little supervision and labor requirement.

SUMMARY OF THE INVENTION

It is an object of the invention to provide an improved method for transporting objects on conveyers, especially rafts used as part of water rides offered for amusement, by releasably securing such objects to the conveyer during transit.

It is also an object of the invention to provide a solution to the problem of transporting rafts on steeply inclined conveyers.

It is a further object to improve the reliability of operation of raft conveyer transport, and to reduce security hazards in such operation.

It is also an object of the invention to facilitate the automatic operation of raft conveyer systems, thereby reducing labor requirements and reducing operating costs.

DETAILED DESCRIPTION OF THE DRAWINGS

Figure 1:
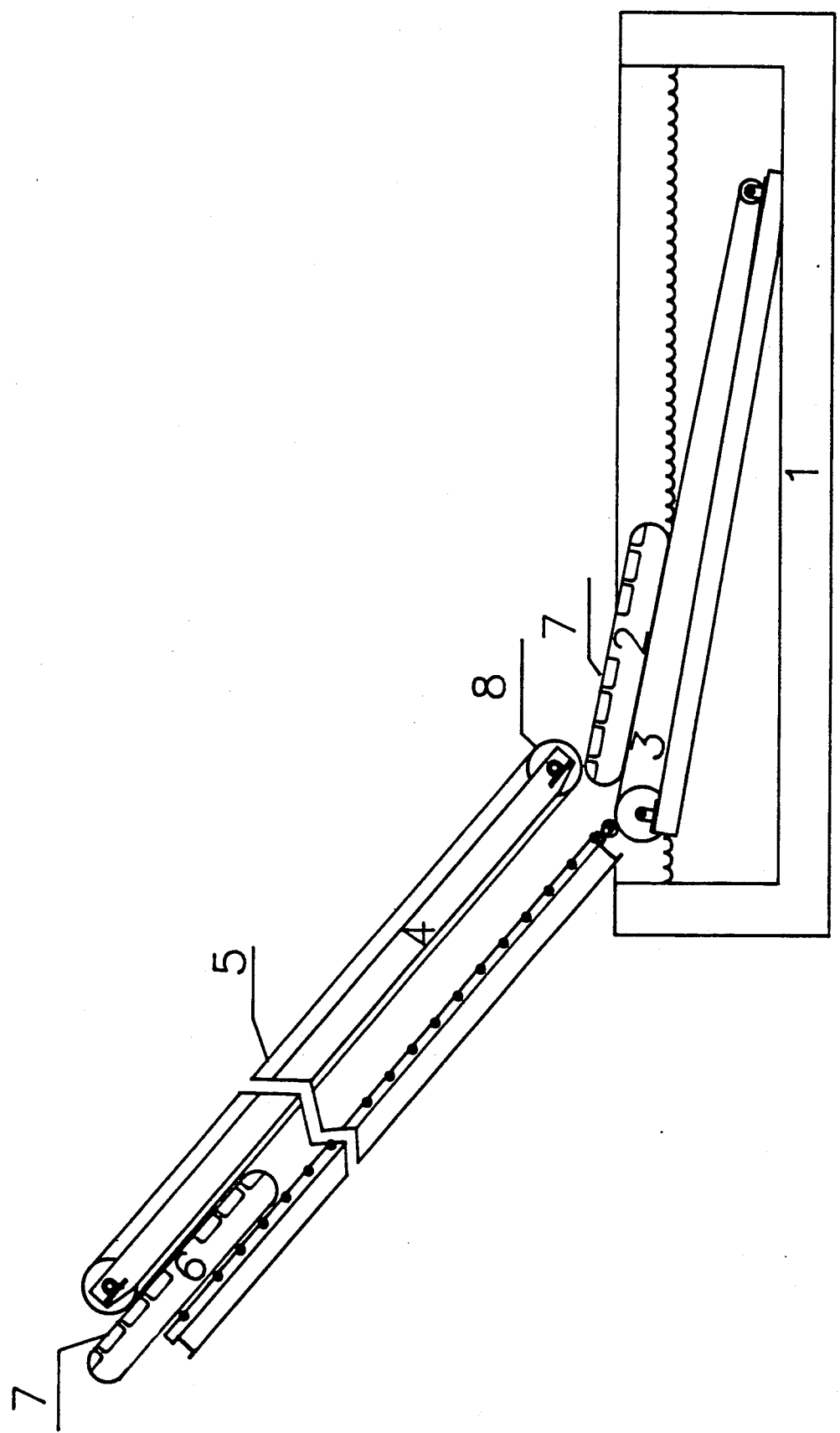
FIG. 1 illustrates a preferred embodiment of the invention, showing two rafts provided with loop material on their top portions, and a main, steeply inclined conveyer, with a conveyer belt provided with hook material to releasably secure the rafts during transport to the top of the conveyer.

The present invention covers a conveying system using hook and loop materials and forming part of a closed-loop transport system. A common trade name for such hook and loop materials is VELCRO(®). The system consists of the following elements:

(1) One or more upwardly inclined conveyers provided with hook or loop surfaces, which releasably attach to:

(2) Transportable objects, especially inflatable, semi-rigid or rigid approximately circular or oval rafts, such as used for water rides in amusement parks, equipped with loop or hook materials for latching on to the conveyer. By means of the matching hook and loop surfaces the rafts are releasably attached to the conveyer at the infeed end irrespective of their orientation in the plane with respect to the conveyer. After being moved by the conveyer, the objects are released from it at its end.

The objects are subsequently returned to the front end of the conveyer by any suitable means, rafts normally by means of a water flume, and reloaded onto the conveyer. Auxiliary devices of various types may be required to steer rafts into position for loading. In addition, loaders, feeders, or tilting devices may be required to ensure loading onto the main conveyer, or conveyers equipped with the latching hook or loop surfaces. The conveyers may be of various types, using belts, chains, or other transporting elements. Normally, the hook material will be fixed to the conveyers, and the loop material to the objects. However, the loop material may be attached to the conveyer, and the hook material to the objects transported. The hook and loop materials may principally be affixed in two different ways to rafts: To the top portion of the rafts, or to the bottom portion. Both methods are suitable for industrial use, the preference depending on several factors, especially on the materials used in flumes, and in other parts, that may come into contact with the rafts. This selection influences the design of the conveyers, as well as of loading and separating devices.

The hook and loop materials may be secured to the conveyers and to the objects in any suitable way. Stitching or sewing has been found satisfactory for conveyer belts and rafts, but other methods, such as gluing, cementing, or heat sealing, may also be employed.

Since the objects transported will adhere to the conveyer without precise positioning to latching elements, "and irrespective of their orientation in the plane with respect to the conveyer," automatic loading of the objects, such as rafts, onto the conveyer is generally easy to achieve, for example by the use of mechanical guides, water jets, air currents, etc. Loading into the main conveyer, which is provided with latching hook or loop elements, may require feeder conveyers, tilting devices, or other means. This will often occur in the case of steep angles of elevation.

Release and unloading at the end of the conveyers is easily automated, whether the rafts or other objects adhere to their top or bottom surfaces.

FIG. 1 illustrates a conveyer system according to a preferred embodiment of the invention, showing a water trough (1), from which the rafts(2, 6), two of which are shown, are fed, first into a feeder conveyer(3), and from that conveyer into a main conveyer(4). At the infeed end of the conveyer(4) the rafts will be releasably attached to a conveyer belt(5), and, after being moved to the end of the conveyer, released from it, as shown with raft(6). This embodiment of the invention uses loop materials(7) attached to the top portion of the rafts, and hook materials(8) attached to the conveying part.

Figure 2:
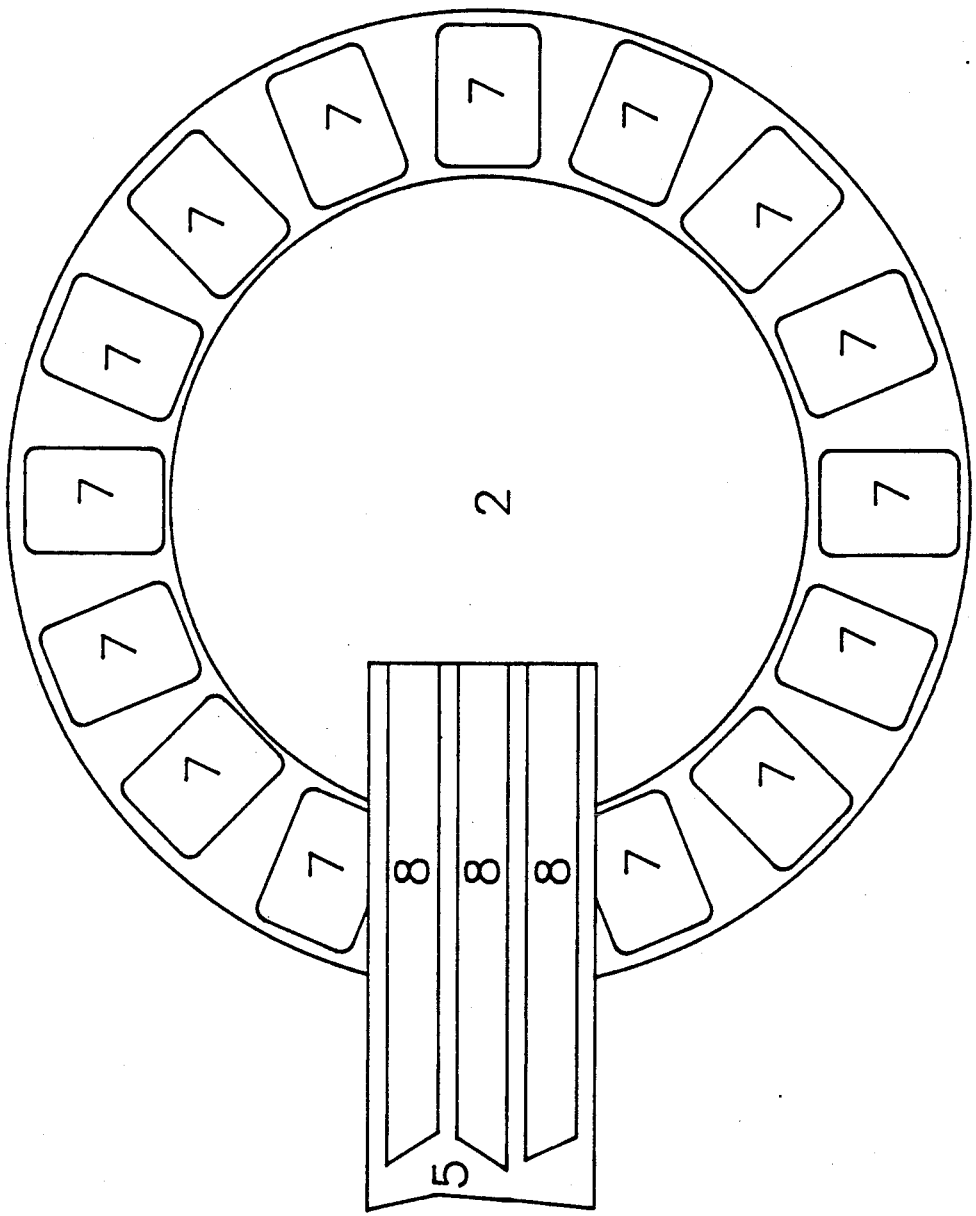
FIG. 2 illustrates details of a raft and of the conveyer belt shown in FIG. 1 in a top view.

FIG. 2 shows details of a raft(2) in a top view according to FIG. 1 in a preferred embodiment, with loop materials(7) on its top portion. Also shown is the infeed end of a main conveyer belt(5) with hook materials(8). The arrangement of the patches and strips of hook and loop materials is subject to numerous variations, only one of which is shown here.

Figure 3:
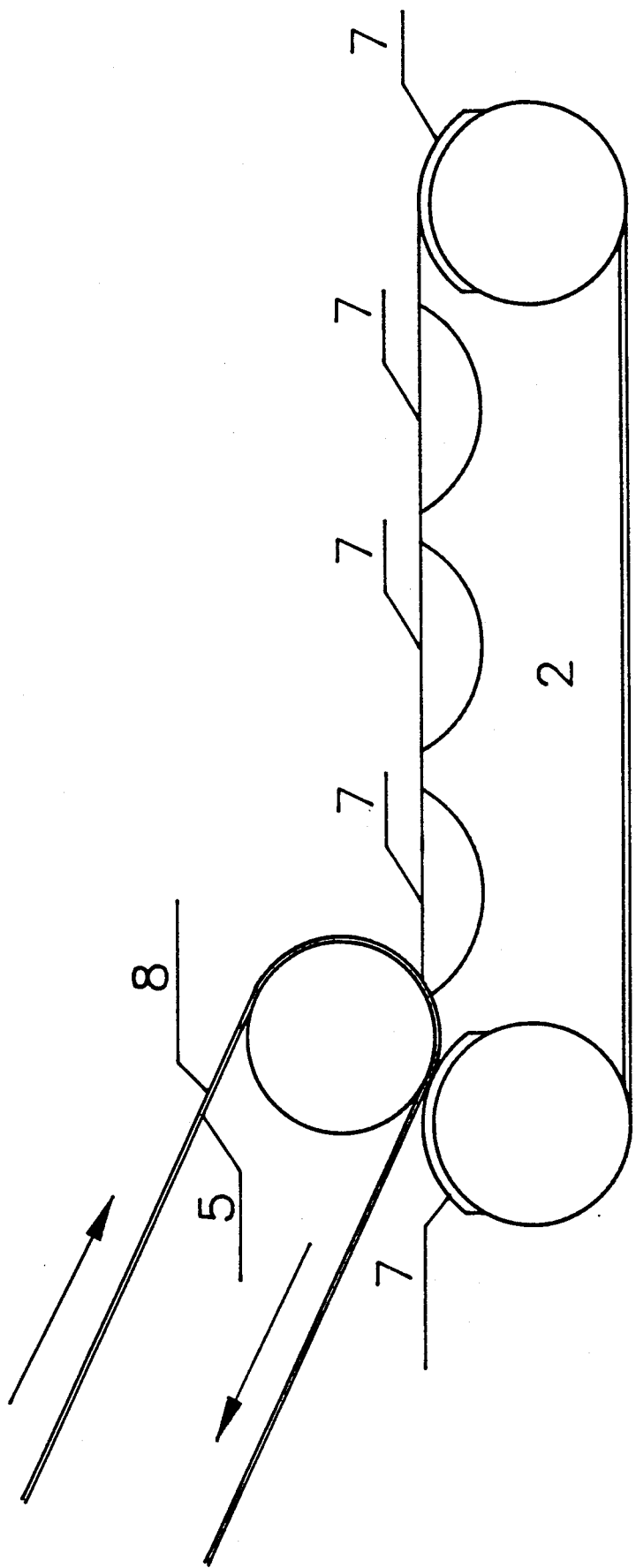
FIG. 3 illustrates details of the raft and of the conveyer belt shown in FIG. 2 in a lateral view.

FIG. 3 shows a lateral view of the infeed end illustrated in FIG. 2 with a section through a raft(2) being loaded into a main conveyer belt(5). The hook materials(8) on the belt are engaging the loop materials(7) on the raft.

Figure 4:
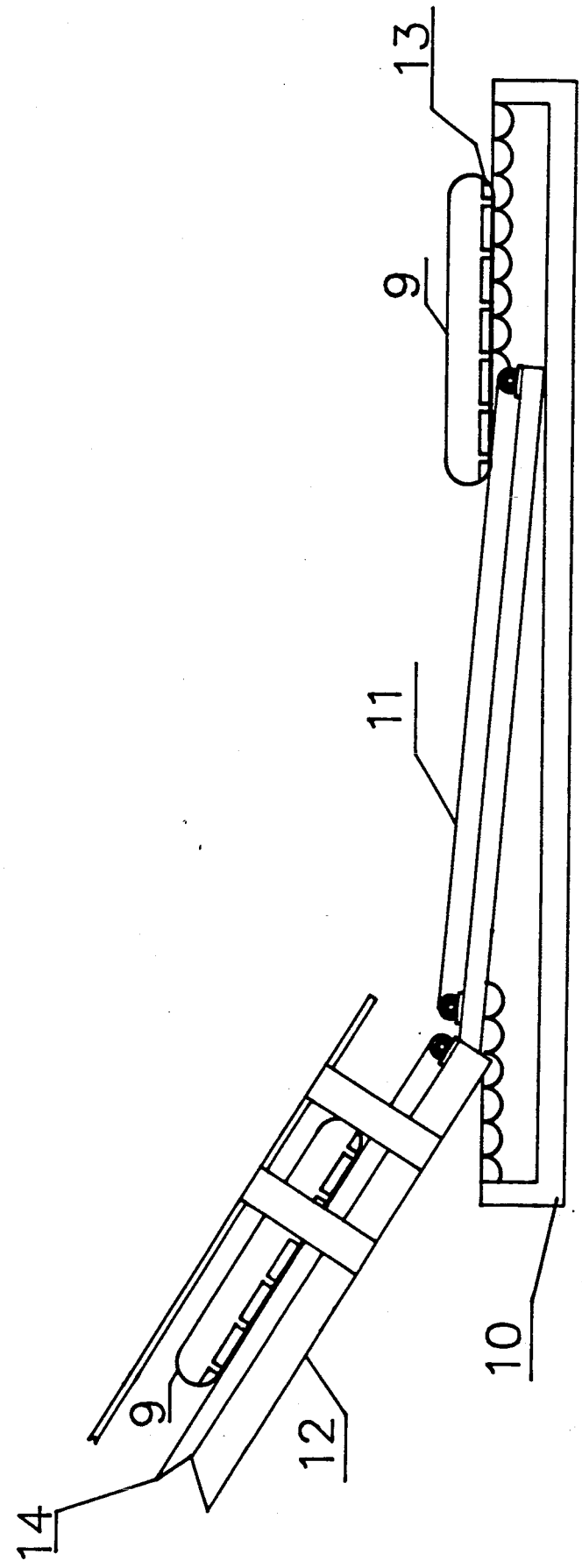
FIG. 4 illustrates a second embodiment of the invention, showing a raft, with loop materials on its bottom portion, and a main, steeply inclined conveyer, with a belt provided with hook material to releasably secure the rafts during transport to the top.

FIG. 4 illustrates a second embodiment of the invention, in which rafts(9), are moved from a water trough(10) onto a feeder conveyer(11) and into a main conveyer(12). In this case the rafts are provided with loop materials on their bottom surfaces(13), and the belt of the main conveyer(12) with hook materials(14).

Figure 5:
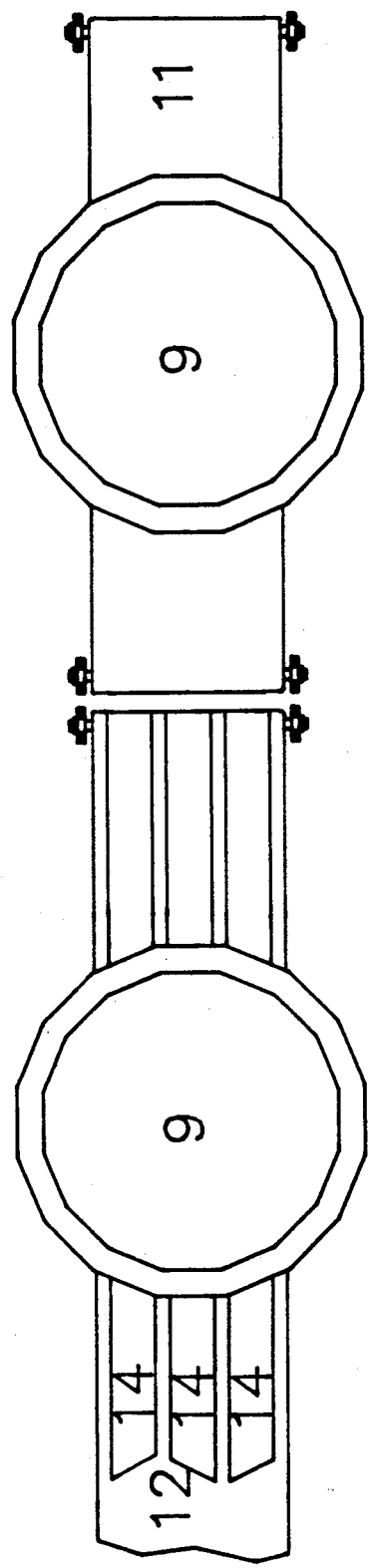
FIG. 5 illustrates a raft according to FIG. 4, a feeder conveyer, and the main conveyer belt securing one of the rafts at its bottom, by means of the hook material on the belt.

FIG. 5 shows some details of a second embodiment of the invention according to FIG. 4: two rafts(9) with loop materials on the bottom surfaces(not visible here), a feeder conveyer(11), and a main conveyer(12) provided with hook materials(14).

Figure 6:
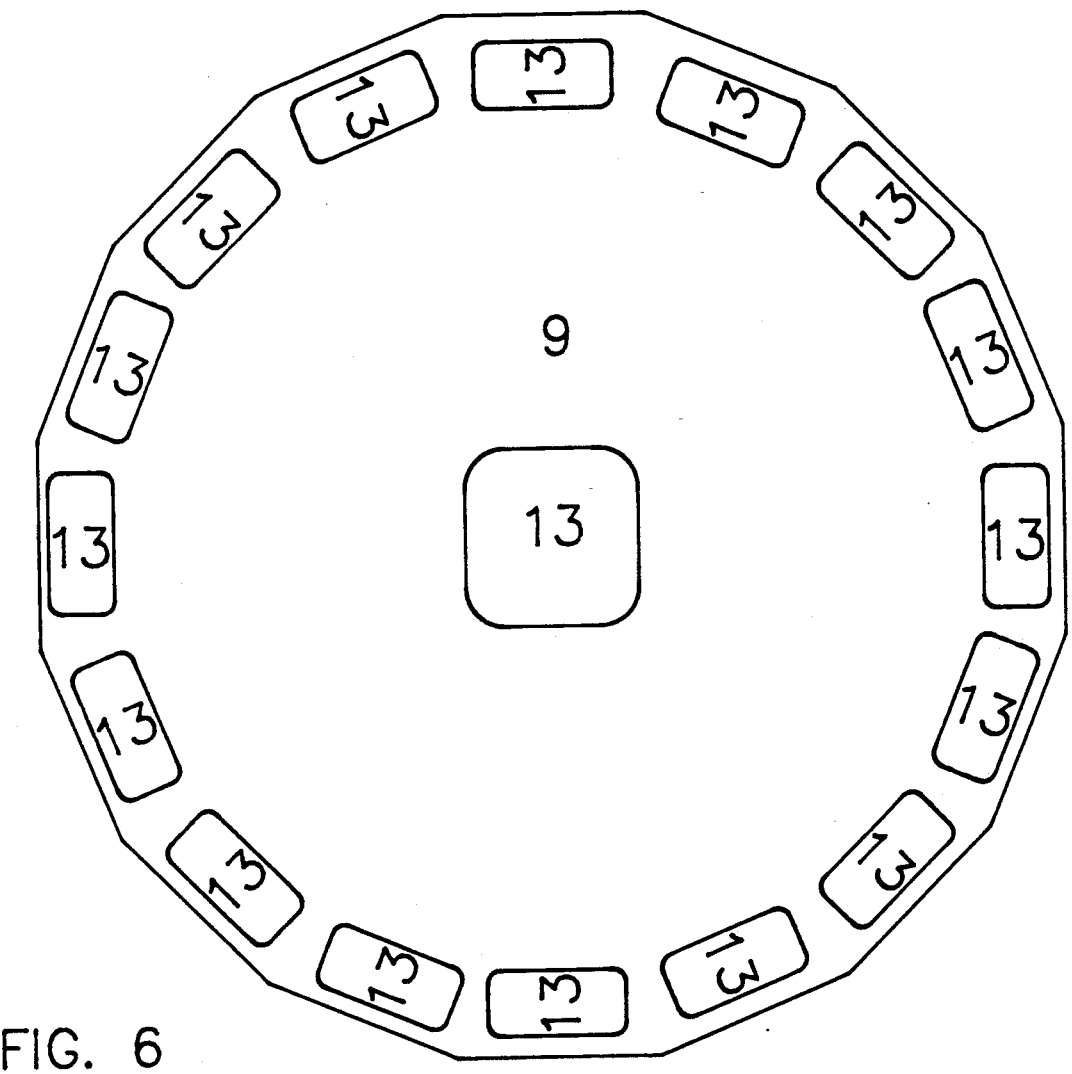
FIG. 6 illustrates an example of the application of patches of loop material to the bottom of a raft as shown in FIG. 4 and FIG. 5.

FIG. 6 shows the bottom surface of a raft(9) according to a second preferred embodiment of the invention, as illustrated in FIG. 4 and FIG. 5, with one of many possible arrangements of loop materials(13) attached to it. Modifications and changes from the specific forms of the invention herein shown as typical examples will occur to those skilled in the art. All such modifications and changes, not departing from the spirit of invention, are intended to be embraced within the scope of the appended claims.

What is claimed is:

1. Conveying system using hook and loop materials, forming part of a closed-loop transport system, and consisting of one or more upwardly inclined conveyers provided with hook or loop surfaces for the transport of objects, especially rafts: "such as used in water rides for amusement, the rafts being approximately circular or oval," inflatable, semi-rigid, or rigid, equipped with the matching loop or hook surfaces, the rafts to be releasably attached to the conveyer by means of the hook and loop materials irrespective of the orientation of the rafts with respect to the conveyer, and, after transport to the desired point, there to be released from the conveyer, and subsequently returned by any suitable means to the front end of the conveyer for repeating the cycle;

2. The conveyer system of claim 1, with the hook element attached to the conveyer, and the loop element to the objects to be transported;

3. The conveyer system of claim 1, with the loop element attached to the conveyer, and the hook element to the objects to be transported;

4. The conveyer systems of claims 1, 2, or 3, with the hook or loop material attached to the top portion of the objects to be transported;

5. The conveyer systems of claims 1, 2, or 3, with the hook or loop material attached to the bottom portion of the objects to be transported.

* * * * *